Oct. 9, 1956 W. C. LUEBKING 2,766,436

TERMINAL STAND-OFF DEVICE

Filed June 15, 1953

INVENTOR.
WALTER C. LUEBKING
BY Marvin Moody
ATTORNEY

United States Patent Office 2,766,436

Patented Oct. 9, 1956

2,766,436

TERMINAL STAND-OFF DEVICE

Walter C. Luebking, Cedar Rapids, Iowa, assignor to Collins Radio Company, Cedar Rapids, Iowa, a corporation of Iowa Application June 15, 1953, Serial No. 361,498

4 Claims. (Cl. 339—198)

This invention relates generally to terminal stand-off devices and in particular to lead terminating devices which allow large numbers of leads to be terminated in a specified order in a very small amount of space.

In electronic equipment it is oftentimes found that space is very critical where large numbers of leads must be terminated in an orderly sequence. Under such conditions it is found that conventional terminal blocks occupy too much space for the available terminal.

It is therefore the principal object of this invention to provide a terminal device that allows sturdy terminal connections for a very large number of leads in an orderly manner and in a minimum of space.

A feature of this invention is a block of insulating material which has an upper and a lower series of bays. The upper bays are staggered with respect to the lower bays. A conducting element is embedded through each bay so that incoming and outgoing leads are arranged on opposite sides of the block.

Further advantages, objects and features will become apparent to a person skilled in the art upon a further study of this specification and the drawings, in which.

Figures 1, 2, 3:
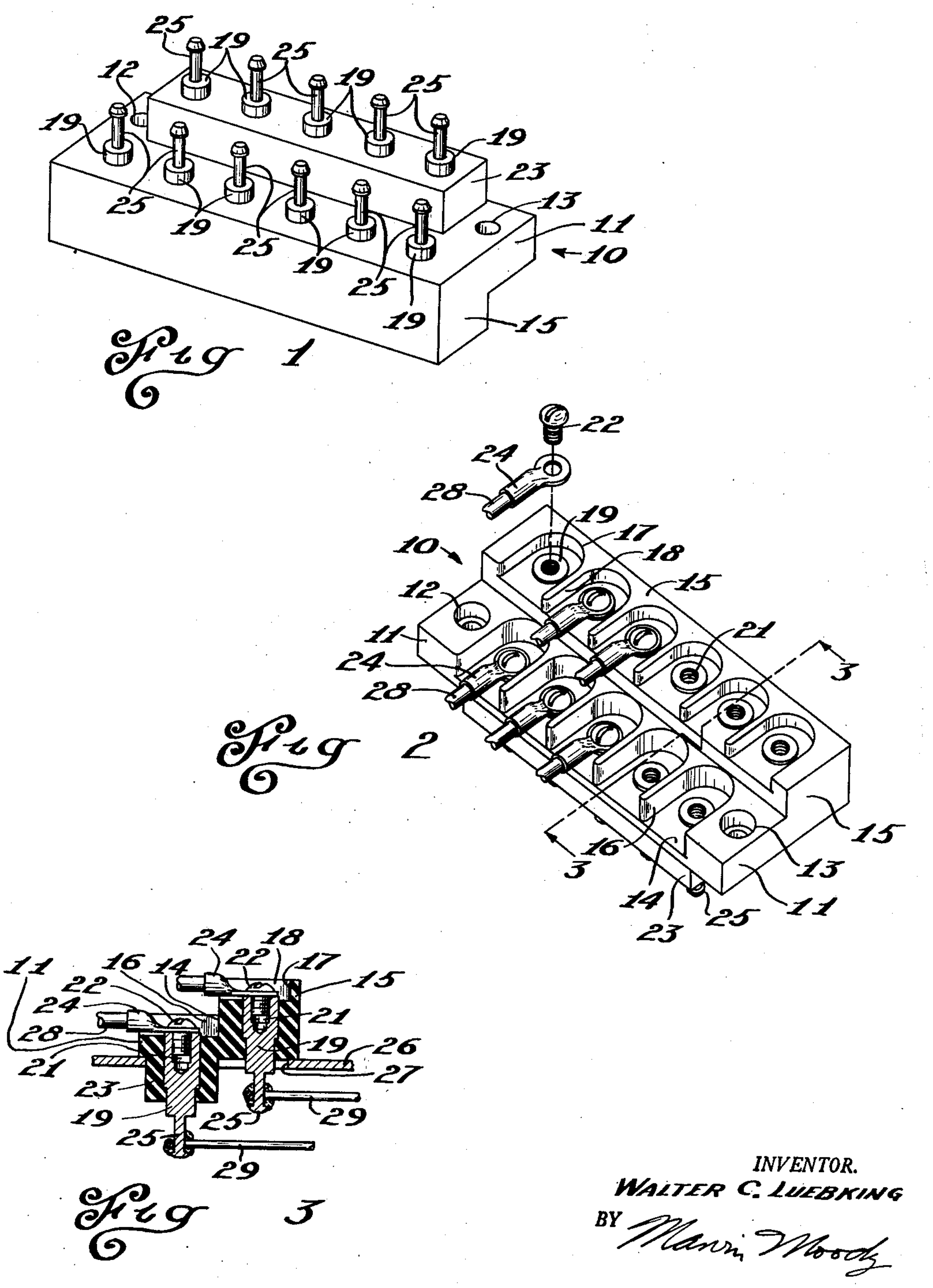
Figure 1 is a perspective view of the bottom of one embodiment of this invention.
Figure 2 is a perspective view of the top of the embodiment shown in Figure 1.
Figure 3 is a broken sectional view of section 3—3 indicated in Figure 2.

Now referring to this invention in more detail, Figure 2 shows a block 10 of insulating material that might be any one of numerous types of plastic or rubber compositions. Block 10 has a lower step or level 11 which has a series of indentations or bays 14 that are separated by partitions 16. Block 10 also has an upper step or level 15 which has a series of upper indentations or bays 17 that are separated by partitions 18. Upper bays 17 are alternated or staggered with respect to lower bays 14 so that each upper partition 18 is out of line with each lower partition 16. The underside of block 10 has a rectangularly shaped portion 23 situated beneath lower level 11 which projects below the back surface of upper level 15. This is shown in Figure 1. Countersunk holes 12 and 13 are respectively arranged on opposite sides of lower level 11.

A cylindrical conducting element 19 is embedded through each of the bays 14 and 17. Element 19 has an internally threaded upper portion 21 that receives a capped screw 22 within bays 14 and 17 and has a smaller diameter lower portion 25 that extends from its lower end.

The terminal stand-off may be mounted to a radio chassis 26 as shown in Figure 3. A rectangular opening 27 may be formed in the chassis 26 and the lower portion 23 and ends 25 of elements 19 extend therethrough. The edges of the terminal stand-off engage the chassis 26 and suitable holding bolts may be passed through openings 12 and 13 and aligned openings formed in the chassis (not shown).

A first plurality of leads 28 are connected to lead clips 24. The clips 24 have openings through which screws 22 may extend to lock them to the tops of elements 19.

A second plurality of leads 29 may be soldered to the lower ends 25 of elements 19.

Due to the lateral and vertical offsets of partitions 16 and 18, the ends of leads 28 and 29 do not engage and thus cause undesirable contacts. The offsets and partitions allow many more terminations to be made in a limited space than is possible with conventional terminal boards while assuring lack of contact between adjacent leads.

It is therefore seen that an orderly sequence is obtained for a large number of leads which are easily detachable and rearrangeable. The bays 14 and 17 may be individually numbered for clarity in wire tracing. Any number of permanently mounted leads may therefore be confined in a very small space and yet ease of location and wire tracing is still obtained.

While a specific embodiment has been described, it is understood that a person skilled in the art may make various changes and modifications within the scope of the appended claims.

I claim:

1. A terminal stand-off comprising, a generally rectangular block of insulating material formed with a pair of steps and a lower extending rectangular portion which is shorter in length than the remainder of the block, a plurality of bays formed in the upper and lower steps on one side thereof and laterally offset from each other, a first plurality of conducting elements extending through the bays formed in one of the steps, and a second pluraltiy of conducting elements extending through the bays formed in the other step and through the lower extending portion.

2. A terminal stand-off comprising, a generally rectangular block of insulating material formed with a pair of steps and a lower extending rectangular portion which is shorter in length than the remainder of the block, a plurality of bays formed in the upper and lower steps on one side thereof and laterally offset from each other, a first plurality of conducting elements extending through the bays formed in one of the steps, and a second plurality of conducting elements extending through the bays formed in the other step and through the lower extending portion, and fastening means on one end of said first and second plurality of conducting elements within said bays.

3. A terminal stand-off comprising, a generally rectangular block of insulating material formed with a pair of steps and a lower extending rectangular portion which is shorter in length than the remainder of the block, a plurality of bays formed in the upper and lower steps on one side thereof and laterally offset from each other, a first plurality of conducting elements extending through the bays formed in one of the steps, a second plurality of conducting elements extending through the bays formed in the other step and through the lower extending portion, fastening means on one end of said first and second plurality of conducting elements within said bays, and the ends of the first and second plurality of conducting elements terminating at the different levels.

4. A terminal stand-off comprising a block of insulating material having a first and a second plurality of steps, said first plurality of steps extending the length of said block on one face, at least one step of said second plurality of steps being shorter in length than the length of said block, said second plurality of steps being on a face opposite said one face and approximately paralleling said first plurality of steps, a plurality of bays formed in said first plurality of steps, the bays formed in each of said steps being offset along the length of said block from the bays formed in the adjacent steps, and a plurality of conducting elements extending through said bays.

References Cited in the file of this patent

UNITED STATES PATENTS

| | | |
|---|---|---|
| 2,265,363 | Fisher | Dec. 9, 1941 |
| 2,411,014 | Warnke | Nov. 12, 1946 |
| 2,438,572 | McCormack | Mar. 30, 1948 |
| 2,463,033 | Harnett | Mar. 1, 1949 |